A. E. TERRY.
SCREW LOCKING NUT.
APPLICATION FILED DEC. 21, 1908.

926,517.

Patented June 29, 1909.

Witnesses:

Inventor
Alfred Ernest Terry
By
James L. Norris
Atty.

UNITED STATES PATENT OFFICE.

ALFRED ERNEST TERRY, OF REDDITCH, ENGLAND.

SCREW-LOCKING NUT.

No. 926,517.

Specification of Letters Patent.

Patented June 29, 1909.

Application filed December 21, 1908. Serial No. 468,585.

*To all whom it may concern:*

Be it known that I, ALFRED ERNEST TERRY, subject of the King of Great Britain, residing at Redditch, England, have invented certain new and useful Improvements in Screw-Locking Nuts, of which the following is a specification.

This invention relates to improvements in or connected with the locking of screw nuts, and refers to certain means by which the nuts may be turned in the screwing up direction from time to time as may be required, but are incapable of a reverse movement, and to certain releasing means by which the said nuts may be unscrewed.

In order to more clearly explain this my invention I have appended hereunto an illustrative sheet of drawings, upon which are figures and numbers of reference.

Figure 1:
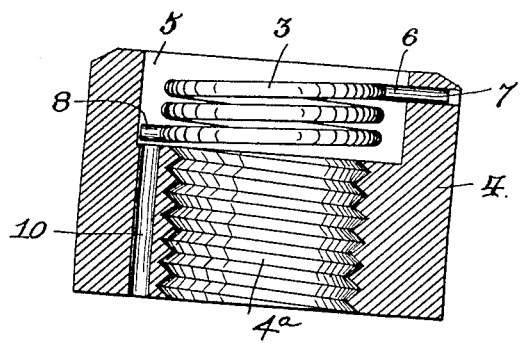
Figure 2:
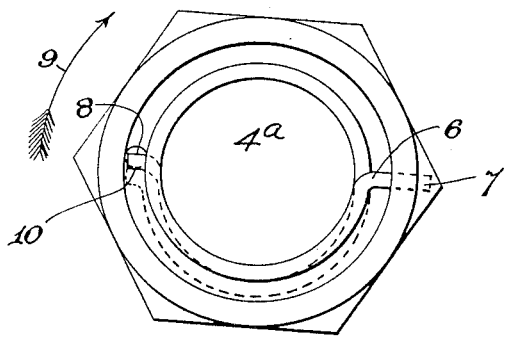

Figure 1 is a vertical sectional view of the invention, and Fig. 2, a plan view of the same.

Similar reference numerals are used for the same parts in both figures.

In the drawing, 4 indicates a nut provided with the usual threaded opening 4ª for a bolt and a recess 5 in one end thereof, concentric with, but of greater diameter than said opening. Within said recess is placed a coil of wire 3 adapted to fit snugly into the screw threads of a bolt on which the nut 4 may be fitted. The coil 3 is preferably formed with three turns although this number may be increased or diminished as desired. One end 6 of the coil 3 is bent radially and secured to the nut 4 by means of a hole 7 made in the side of the nut, into which the end 6 is passed. The other end 8 of the coil is practically free (when operatively in use), consequently, when screwing up the nut in the direction of the arrow 9 the tendency of the coil is to unwind, and therefore to loosen itself sufficiently on the bolt to follow the nut, so that the nut can be readily screwed home, but when the attempt is made to unscrew the nut, the latter pulls the end 6 and therefore tightens the coil upon the screwthread of the bolt movement of the nut, being thereby prevented since the greater the effort to turn the nut, the greater the binding or wrapping action of the coil upon the bolt.

10 is a hole drilled in the nut, and in such a position, that when a pin or the like is pushed therein, the end 8 of the coil is moved and held backward (as shown in dotted lines), that is, its coils are slightly increased in diameter, and the binding action thereby withdrawn, so that the nut may now be unscrewed in the ordinary manner. It will also be seen that because of the length of the hole 10, a pin inserted therein will be retained in place as long as may be desired, by the resisting pressure of the coil. The releasing pin is not shown, because not of special make, inasmuch as any pin, peg, wire, or the like of a suitable size to pass down the hole 10 will answer the purpose.

Though it is preferable that the insertion of the pin shall move the free end of the coil slightly backward in order to insure the easy unscrewing of the nut. In practice it is not necessary that the end of the coil shall be actually moved backward, but it is sufficient for the pin to hold the end of the coil against advancement relatively to the nut while the latter is being unscrewed.

By placing the coil in the recess in the nut as shown, it is perfectly protected, and is also concealed from view, there being nothing unusual upon the external face of the nut.

It will be readily seen that the position of the nut upon the bolt may be reversed, by simply reversing the order of the ends of the coil, that is to say, making the end 6 (now shown as the fixed end) to be the free end, and by making the end 8 (now shown as the free end) to be the fixed end, and in which case, the recess 5 would be on the underside of the nut.

Having now fully described and ascertained my said invention, and the manner in which it is to be performed, I declare that I am aware that it has been proposed to use coils of wire in connection with screw nuts for preventing unintentional unscrewing under vibrations or other shocks, and therefore I do not claim the application of such coils broadly, but only when adapted to be used with the hereinbefore described releasing hole and pin or their equivalent, and

What I claim is:—

A lock nut comprising a nut proper formed with a recess in one end larger than and concentric with the threaded opening in the nut and also provided with a hole extending inwardly from the bottom of said recess, and a wire coil in said recess having one of its ends bent radially and secured to the nut and its other end left free and overlying said hole, said wire coil being adapted to fit snugly in the threads of a bolt when fitted to the nut to clamp the same.

In testimony whereof I have hereunto set my hand in presence of two subscribing witnesses.

ALFRED ERNEST TERRY.

Witnesses:
J. BERNARD HAYWARD,
H. GOODWIN.